Patented Jan. 30, 1951

2,539,706

UNITED STATES PATENT OFFICE 2,539,706

COPOLYMER OF DIMETHALLYL ETHER AND AN ALKYL ACRYLATE

Robert H. Snyder, Chicago, Ill., assignor to United States Rubber Company, New York, N. Y., a corporation of New Jersey No Drawing. Application April 19, 1946, Serial No. 663,618

3 Claims. (Cl. 260—86.1)

My invention relates to the preparation of soluble, convertible resins from dimethallyl ether and an ester of an acid from the class consisting of propenoic acid and 2-alkyl propenoic acids with a non-enic monohydric alcohol, hereinafter designated a propenoic ester.

As shown in U. S. Patent No. 2,160,943, the copolymerization of a ternary mixture of an acrylic ester and vinylidene chloride with small amounts of dimethallyl ether results in the formation of infusible and/or insoluble products. Such materials are difficult to manipulate in subsequent processing and are of limited utility in many commercial applications such as coating, impregnating and laminating operations wherein soluble, fusible resins, capable of being ultimately cured to a heat and solvent-resistant state, are required or preferred.

Contrary to what would be expected from the prior art disclosure, of insoluble, cross-linked ternary interpolymers of a propenoic ester, vinylidene chloride and dimethallyl ether, I have now unexpectedly found that a propenoic ester in the absence of other polymerizable compounds can be copolymerized directly with dimethallyl ether to give excellent yields of soluble, unsaturated resins. Further, I have made the surprising discovery that as the molar ratio of the cross-linking dimethallyl ether to the propenoic ester is increased above approximately 1:5, the amount of the propenoic ester which can be converted to the polymeric form before gelation, is also increased, and in the presence of a sufficient quantity, e. g., a molar ratio of 4:1, of the dimethallyl ether, essentially all of the propenoic ester can be converted to unsaturated copolymer without insolubilization. Moreover, it is also possible by my invention to secure soluble copolymers which, unlike those of the prior art, can contain considerable amounts of the dimethallyl ether. For example, I can readily prepare a soluble copolymer of methyl acrylate and dimethallyl ether in which the ether constitutes over 50% by weight of the product.

In further contrast to the prior art, the products obtained according to my invention show little or no tendency to cure to the insoluble, infusible state even when heated at elevated temperatures, e. g., 100° C., with peroxidic catalysts, although they gradually become insoluble and even infusible upon prolonged heating at temperatures in the neighborhood of 200° C. Since the latter is near the upper limit of processing temperatures commonly employed for plastic materials, the products obtained according to my invention behave for many purposes as soluble thermoplastic resins and are useful as such. In view of the resistance of these unsaturated copolymers to further polymerization, it is surprising to find that they copolymerize readily with reactive monomers containing an ethylenic linkage ($>C=C<$), e. g., diethyl fumarate, to yield insoluble, infusible products. This property extends the utility of my copolymers to include not only the thermoplastic but the thermosetting types of resins as well.

Copolymers prepared according to my invention range in character from easily comminuted solids to viscous or plastic masses depending upon the relative proportion of the reactants and upon the choice of an appropriate propenoic ester. In general, the softening points and molecular weights of the copolymers tend to decrease as the amount of the dimethallyl ether in the reactant mixture is increased. For any given molar ratio of dimethallyl ether to propenoic ester, copolymers derived from the propenoic esters of lower alcohols, e. g., methanol and ethanol, will be harder and higher melting, while the propenoic esters of the higher alcohols, such as n-butanol and octyl alcohol, yield copolymers of the softer, more plastic type which likewise possess a greater compatibility with hydrocarbon solvents. Suitable propenoic esters for use in my invention are represented by the type formula $CH_2=C(R)-CO-OR'$ where R is one of the radicals, hydrogen and alkyl, e. g., methyl and ethyl, and R' is one of the radicals, alkyl, e. g., methyl, ethyl, propyl, isopropyl, butyl, etc.; aryl, e. g., phenyl; and aralkyl, e. g., benzyl. Exemplary of such esters are n-butyl acrylate, methyl methacrylate, methyl acrylate, methyl ethacrylate, and phenyl acrylate, etc. Products of physically intermediate character can be secured by copolymerizing dimethallyl ether with a mixture of propenoic esters, such as methyl methacrylate and butyl acrylate; or by an alcohol interchange between the binary copolymer and the appropriate alcohol, e. g., between the methyl ester copolymer and butanol, hexanol, or allyl alcohol.

Preparation of my new copolymers is carried out by heating a mixture of the dimethallyl ether and the propenoic ester in the range of about 25° C., up to the reflux temperature of the reaction mixture, and for overall economy I prefer to operate in the latter range although where higher boiling propenoic esters are employed, lower temperatures. e. g., 100° C., generally prove satisfactory. Temperatures above the boiling point of the reaction mixture can of course be employed but the necessary pressure equipment entails additional expense without offering any marked compensating advantages. The copolymerization reaction is accelerated by peroxidic compounds, such as acetyl peroxide, benzoyl peroxide, acetyl benzoyl peroxide, succinyl peroxide, and tertiary-butyl hydrogen peroxide.

The course of the copolymerization can be followed by observing the increase in viscosity of the reaction mixture, and after halting the reaction by cooling, the copolymer can be isolated by distilling off any unreacted starting materials or by extracting them with a solvent, e. g., aqueous methanol, in which the copolymer is insoluble. Although unnecessary in most commercial applications my copolymers can be further purified for specialized uses by solution in a solvent, such as acetone and precipitation with a non-solvent, such as a methanol-water mixture.

When freed from solvents, my copolymers can be cast or molded in a known manner to form rods, blocks, sheets, etc., and in this form they are particularly useful where clear, flexible articles are required such as safety glass interlayers. Alternatively, the copolymers can be dissolved in the solvents and used for coating and impregnation processes. In the preparation of such solutions it is often unnecessary to isolate the copolymer, for higher-boiling solvents, e. g., xylene can be added directly to the crude copolymerization reaction mixture and unreacted starting materials can then be removed by fractional distillation. Suitable dyes, pigments, fillers, plasticizers, and resins can be incorporated with my copolymers to modify the character for specific applications.

Where heat and solvent-resistant materials are desired, my products can be easily converted to the insoluble, infusible state by copolymerization with reactive compounds containing an ethylenic linkage such as methyl acrylate, diethyl fumarate, diallyl fumarate, etc. My copolymers dissolve readily in a number of these reactive ethylenic compounds to form solutions, many of which display low viscosities even at relatively high solids content. These solutions can be totally polymerized leaving no solvent to be evaporated, and this property renders them particularly suitable for coating and impregnating compositions, which can be cured to the insoluble, infusible state with a minimum of blowing, shrinking and distortion. Curing temperatures from 60° C. to 120° C. are suitable.

The following examples illustrate my invention, in more detail, parts being by weight:

EXAMPLE 1

To illustrate my discovery that the copolymerization of dimethallyl ether with a propenoic ester leads to the formation of soluble, polymeric materials, mixtures of dimethallyl ether and methyl acrylate in various proportions are heated with benzoyl peroxide at 60° C. until the point of incipient gelation is attained in each case. The copolymerizations are then halted by cooling and the reaction mixtures are poured into a commercial grade of n-hexane. The precipitated copolymers are further purified by repeated solution in chloroform and precipitation with n-hexane. After drying in vacuo to constant weight, the amounts of the copolymeric products are determined.

The pertinent details are summarized in Table I, including the weights of the copolymerizable monomers, the peroxide catalyst and the copolymeric products as well as the reaction times. For purposes of comparison only, the polymerization of dimethallyl ether in the absence of an acrylic ester is also included (I—f) to show that dimethallyl ether polymerizes with itself only to a negligible extent.

*Table I*

| | Methyl Acrylate | Dimethallyl Ether | Benzoyl Peroxide | Reaction Times (hours) | Polmeric Product |
|---|---|---|---|---|---|
| a | 100 | 36.6 | 0.09 | 1.00 | 23.3 |
| b | 100 | 146.0 | 0.12 | 2.33 | 48.4 |
| c | 100 | 220.0 | 3.49 | 2.00 | 74.6 |
| d | 100 | 342.0 | 4.65 | 10.00 | 89.3 |
| e | 100 | 585.0 | 6.97 | 165.0 | 162.0 |
| f | | 100 | 0.823 | 450.0 | 2.3 |

The contents of Table I clearly demonstrate that the amount of soluble copolymer obtained prior to gelation increases with the amount of dimethallyl ether present in the reaction mixture. Since example I—f shows that dimethallyl ether alone possesses only a small tendency to homopolymerize, the increasing amounts of copolymers correspond to conversions of increasing amounts of the acrylic ester, as well as the dimethallyl ether, to the copolymeric form.

EXAMPLE 2

(a) A mixture of 68.8 parts of methyl acrylate, 353.8 parts of dimethallyl ether and 2.8 parts of a 60% solution of tertiary-butyl hydrogen peroxide is heated at 90° C. for 24 hours, after which the mixture is cooled to 25° C. and a trace of hydroquinone added to stabilize the mixture for storage during subsequent processing operations.

(b) One hundred parts of the crude reaction mixture from (a) are evacuated at 20° C. and 3 mm. pressure and the residual syrup is poured into n-hexane which precipitates the polymeric products. Further purification is effected by repeated solution of the copolymer in chloroform and precipitation with n-hexane and after drying in vacuo to constant weight 24.0 parts of polymeric solid are obtained which corresponds to a total yield of 101.5 parts from the entire reaction mixture. The copolymer is readily soluble in acetone, chloroform, benzene and xylene. Upon heating, it begins to flow at approximately 158° C. and slowly becomes converted to an insoluble, infusible state at 185° C.–190° C.

*Analysis*

Found: C, 66.25%; H, 9.30%; iodine (Wijs) number 84.2; limiting viscosity $[\eta]_0$ in acetone, 0.143.

The analysis corresponds to a copolymer containing approximately 49.0% by weight of methyl acrylate, and 51.0% of dimethallyl ether. The iodine number indicates the presence of unsaturation which is available for further polymerization.

(c) One hundred parts of the crude reaction mixture from (a) are admixed with 10.3 parts of diethyl fumarate and evacuated at 40° C. and 5 mm. pressure to a viscous syrup. One and four-tenths parts of benzoyl peroxide are then added, and the resin solution is cured in a cylindrical mold by heating for 13 hours at 60° C., 2 hours at 90° C., and finally for 2 hours at 120° C. The resultant casting is clear, hard and insoluble in chloroform.

EXAMPLE 3

(a) Seveny-six and nine-tenths parts of n-butyl acrylate are admixed with 265.1 parts of dimethallyl ether and 2.1 parts of a 60% solution of tertiary-butyl hydrogen peroxide, and heated at 130° C. for 24 hours after which the reaction mixture is cooled to room temperature.

(b) One hundred and fifty parts of the crude reaction mixture were purified as in Example 2—b above, using 80% aqueous methanol as a precipitant in place of n-hexane, to yield 59 parts of plastic solid which corresponds to a total yield of 134 parts of copolymer from the entire reaction mixture.

Analysis

Found: C, 69.92%; H, 10.10%; iodine number 70.1; $[\eta]_0$ in acetone, 0.073.

The analysis indicates a copolymer comprising approximately 58.7% by weight of n-butyl acrylate and 41.3% of dimethallyl ether.

EXAMPLE 4

A mixture of 38.5 parts of isobutyl acrylate, 132.6 parts of dimethallyl ether and 1.05 parts of tertiary-butyl hydrogen peroxide solution is heated at 130° C. for 24 hours. Purification of a sample of the reaction mixture indicates a total yield of 75.5 parts of coplymer.

Analysis

Found: C, 70.74%; H, 10.40%; iodine number 65.8; $[\eta]_0$ in actone, 0.064.

The analysis corresponds to a copolymer containing approximately 49.2% by weight of isobutyl acrylate and 50.8% of dimethallyl ether.

Seven parts of the copolymer are dissolved in 3.0 parts of diethyl fumarate together with 0.4 part of benzoyl peroxide and heated in a mold at 60° C. for 15.5 hours and then for 2 hours at 120° C. The resulting clear casting is insoluble in acetone.

While I have shown and described various embodiments of the invention, it is to be understood that the invention is susceptible to those modifications which appear within the spirit of the invention and the scope of the appended claims.

Having thus described my invention, what I claim and desire to protect by Letters Patent is:

1. A method which comprises polymerizing with heat in the presence of a peroxidic polymerization catalyst a mixture of monomers containing as the sole polymerizable components dimethallyl ether and material from the class consisting of esters of acrylic, methacrylic and ethacrylic acids and in which the ester radical is a saturated hydrocarbon radical having from 1 to 8 carbon atoms, at a temperature in the range from about 25° C. up to the reflux temperature of the mixture, to form a soluble unsaturated interpolymer of said monomers, in which the molar ratio of the ether to the ester ranges from 1:5 to 4:1.

2. A method which comprises polymerizing with heat in the presence of a peroxidic polymerization catalyst a binary mixture of monomers containing as the sole polymerizable components, dimethallyl ether and an ester of acrylic acid in which the ester radical is a saturated hydrocarbon having from 1 to 8 carbon atoms, at a temperature in the range from about 25° C. up to the reflux temperature of the mixture, to form a soluble unsaturated copolymer of said monomers, in which the molar ratio of the ether to the ester ranges from 1:5 to 4:1.

3. A soluble binary copolymer of monomeric dimethallyl ether and an ester from the class consisting of alkyl esters of acrylic, methacrylic and ethacrylic acids and in which the ester radical is a saturated hydrocarbon radical having from 1 to 8 carbon atoms resulting from a binary monomeric mixture in which the molar ratio of the ether to the ester ranges from 1:5 to 4:1.

ROBERT H. SNYDER.

REFERENCES CITED

The following references are of record in the file of this patent:

UNITED STATES PATENTS

| Number | Name | Date |
| --- | --- | --- |
| 2,100,900 | Fikentscher et al. | Nov. 30, 1937 |
| 2,332,895 | D'Alelio | Oct. 26, 1943 |
| 2,340,111 | D'Alelio | Jan. 25, 1944 |
| 2,492,169 | Mast et al. | Dec. 27, 1949 |

OTHER REFERENCES

Norrish et al., Proc. Royal Society, vol. 163A (1937), pp. 205–220.

Powers, "Synthetic Resins and Rubbers," J. Wiley and Sons, Inc., New York, page 146.